Jan. 23, 1968  B. A. FULTON  3,365,037
DIRECTIONAL POWER TRANSMISSION

Filed June 25, 1965  2 Sheets-Sheet 1

INVENTOR.
BERTRAM A. FULTON
BY
*Blair & Buckles*
ATTORNEYS

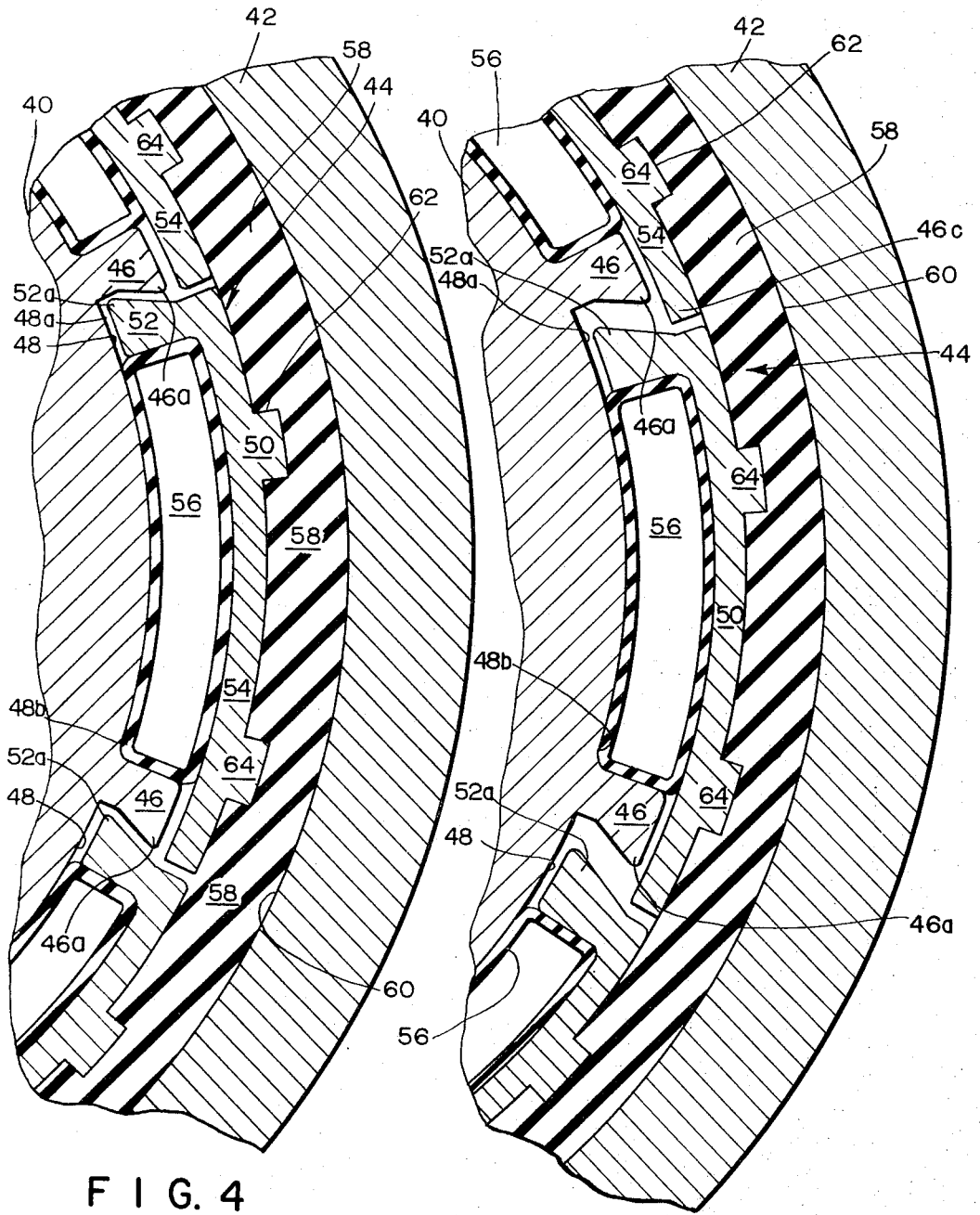

United States Patent Office 3,365,037
Patented Jan. 23, 1968

3,365,037
DIRECTIONAL POWER TRANSMISSION
Bertram A. Fulton, 19 Melch Road,
Lynnfield, Mass. 01940
Filed June 25, 1965, Ser. No. 467,020
16 Claims. (Cl. 192—41)

ABSTRACT OF THE DISCLOSURE

A directional power transmission employs driving and driven members constrained to move relatively along parallel surfaces. A gripper positioned between said members is movable with one of them and frictionally engages the other one. A pressure transmitting body is positioned between the gripper and the member with which it moves. A portion of the gripper compressively engages the body when the members move relatively in one direction so that the body pushes the gripper against the other member, causing both members to move in unison. The gripper remains out of compressive engagement with the body when the members move relatively in the opposite direction so that the two members are free to move independently.

---

This invention relates to means for transmitting power from a driving member to a driven member when the driving member is moving a preferred direction relative to the driven member. The invention has particular application to overrunning clutches and brakes.

Conventional, directional or one-way clutches usually employ sprags, rollers and other such point or line contact active elements to couple together the driving and driven members. Since they transmit the power over relatively small areas of contact, particular parts are subjected to extremely high internal stresses. This leads to excessive wearing of those parts. Some reduction in these internal stresses is possible by employing a large number of such contacting elements, but not without considerably increasing the size and complexity of the clutch. Consequently, many of these prior transmissions have relatively short useful lives or alternatively a small power to weight ratio.

To overcome these problems, a clutch has been developed which distributes the internal forces over a larger area through employment of wedge-shaped cams in mating contact with the driving and driven members. Such a clutch is described more specifically in United States Letters Patent No. 3,107,764. While such clutches are satisfactory in this respect, they have also proved to be fairly expensive to make because of the difficulty in machining the cams to the required tolerances. Also, in use these cams are subjected to frictional forces which tend to oppose the locking of the transmission and consequently reduce the overall efficiency of the device.

Accordingly, this invention aims to provide a power transmission which smoothly and efficiency couples power from a driving member to a driven member when the two are moving in a preferred relative direction.

A further object of this invention is to provide a directional power transmission wherein the engaging members have relatively large contact areas, so that the transmission has a relatively large torque capability for a given size.

Another object of this invention is to provide a directional power transmission characterized by the absence of frictional forces inhibiting the locking action of the transmission.

A further object of this invention is to provide a one-way power transmission for coupling power from a driving member to a driven member whose coupling action is as strong as required to handle the particular load.

A still further object of this invention is to provide a directional power transmission which is simple and economical to manufacture and which employs a minimum number of moving parts.

Another object of this invention is to provide a directional power transmission having minimum lag between its input and output.

A more specific object of this invention is to provide an overrunning clutch possessing the above features and advantages.

Other objects of the invention will in part be obvious and will in part appear hereinafter.

The invention accordingly comprises the features of construction, combination of elements and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 4 is an enlarged fragmentary view, in section, of the overrunning clutch of FIG. 3, and FIG. 5 is a view similar to FIG. 4, showing the clutch at a different stage of its operation.

In general, my power transmission comprises a driving member and a driven member and an intervening "floats" on a body positioned between the driving members are movable relatively along parallel surfaces. The gripping means is constrained to move with one, say, the driving member and includes a large area gripping surface which frictionally engages the driven member. It "floats" on a body positioned between the driving member and the gripping surface. The character of the body is such that when a force is applied to the body in one direction, it exerts pressure in another direction. The body is free to exert pressure in two directions, the first of which is tangential to one direction of movement of the driven member and the second of which is normal to that direction or toward the driven member.

When the driven member moves in one tangential direction relative to the driving member, the frictionally engaging gripping surface tends to move along with it. The motion of the gripping means in this direction applies a force to the body and thus causes it to press out toward the driven member. The body is proportioned so that it exerts a force on the gripping means in the direction toward the driven member which is always larger than the tangential force it exerts thereon. Therefore, the gripping surface is pressed firmly into non-slip engagement with the driven member, and consequently both members move in unison. As the load on the driven member increases, the pressure of the gripping surface against the driven member increases correspondingly, thereby preventing slippage.

When the relative movement of the driving and driven members is in the opposite tangential direction, it applies no force to the body. Consequently, the gripping surface is not pushed into the firm engagement with the driven member, but merely functions as a bearing surface therefor.

My invention is employed in an overrunning clutch capable of transmitting torque from a drive shaft to a driven shaft. The clutch includes concentric inner and outer races connected to the respective shafts and one or more of the aforementioned directional power transmissions arranged between them. The power transmissions lock the inner and outer races together when the drive shaft moves in one direction relative to the driven shaft, but not when it moves in the opposite direction relative thereto.

Figure 1:
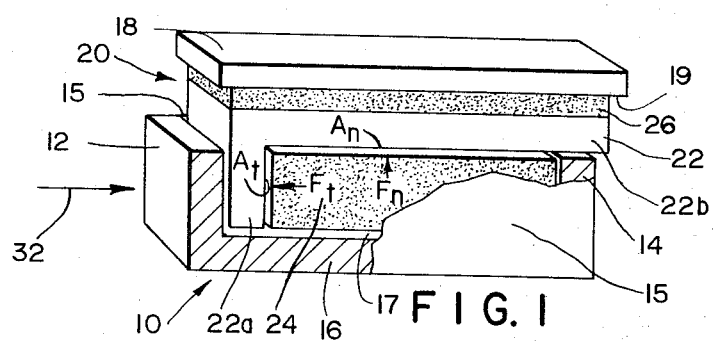
FIG. 1 is a perspective view with parts broken away of a directional power transmission embodying the principles of my invention.

Referring now more specifically to FIG. 1, a simplified form of my improved power transmission is shown to comprise a driving member indicated generally at 10, adapted to be connected to a suitable source of power (not shown) capable of moving the member 10 in both directions along a straight line. Driving member 10 is shown as shaped generally like a box having left and right end walls, 12 and 14 respectively, identical front and rear side walls 15 and a bottom wall 16, together defining a well or pocket 17.

A driven member 18 is spaced above and parallel to member 10. Driven member 18 has a flat surface 19 opposite driving member 10 and is adapted to be connected to any suitable output mechanism (not shown). Both the driving member 10 and driven member 18 are constrained to move in parallel planes and are prevented from moving toward or away from each other by suitable means (not shown).

A gripping means indicated generally at 20 is positioned between members 10 and 18. Gripping means 20 includes a rigid L-shaped retainer 22 whose short leg 22a extends down almost to the bottom of pocket 17 adjacent wall 12. The long leg 22b of member 22 bridges pocket 17 and rests on wall 14 of member 10. The retainer 22 is slidable within pocket 17 to the right as seen in FIG. 1, but its leftward movement is prevented by the end wall 12 of member 10.

Still referring to FIG. 1, a pressure transmitting body 24 is contained within the portion of pocket 17 to the right of leg 22a. Body 24 is illustrated specifically as a rectangular piece of highly resilient elastomeric material such as soft rubber. However, it will be understood that the body can just as well comprise a collection of small rigid balls or cylinders aligned front to back in pocket 17, preferably coated with "Teflon" plastic to reduce internal friction; or it may comprise a fluid-filled chamber or other such means which when subjected to a force in one direction will exert pressure in another diretcion. The last mentioned body construction will be described more particularly later in connection with the FIGS. 3–5 embodiment of my invention. The body 24 can be constrained by front and rear depending skirts on retainer 22 instead of by the walls 15; or the body itself may be made non-extensible in the front-rear direction through incorporation therein of non-stretchable cord or wire extending from front to back.

In the illustrated embodiment, a gripping surface is applied to the top of retainer 22 in the form of a shoe 26. Shoe 26 is constructed of a suitable long wearing material having a relatively high coefficient of friction. The thickness of shoe 26 is such that when the body 24 is in its neutral state of FIG. 1, the shoe 26 just contacts the opposing face 19 of driven member 18. This separate retainer and shoe construction is particularly desirable when the shoe and race have interfitting grooves for increasing the effective coefficient of friction as will be described later with respect to FIGS. 4 and 5. Alternatively, of course, the shoe may simply comprise the leg 22b of the retainer.

In certain cases, to obtain the proper amount of drag on the driven member 18 without maintaining strict manufacturing tolerances, it may be desirable to keep the body 24 under slight compression when it is in the "neutral" state of FIG. 1. This may be accomplished by placing a strong spring (not shown) between the wall 12 and body 22a to bias the retainer to the right as seen in FIG. 1. This will place the body 24 under compression sufficient to create the required amount of drag between the shoe 26 and the driven member 18. This same effect may be accomplished by bonding the opposite ends of body 24 to leg 22a and wall 14 respectively.

Figure 2:
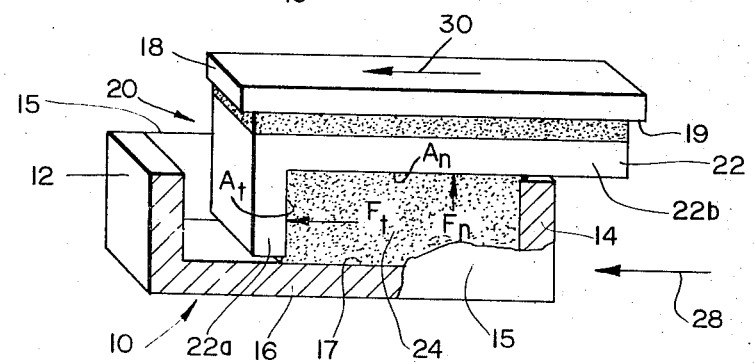
FIG. 2 is a view similar to FIG. 1 showing my transmission at a different stage of its operation.

Referring now to FIG. 2, if the driving member 10 is caused to move to the left in the direction of the arrow 28, the driven member 18, under load, tends to remain still. In other words, it tends to move to the right relative to member 10. The shoe 26, which lightly frictionally engages the driven member 18, also tends to move relatively to the right and carries the L-shaped retainer 22 with it. As the leg 22a of retainer 22 moves toward the wall 14 of driving member 10, the volume available to body 24 is reduced. The body 24, here being constructed of resilient rubber, is compressed endwise and its pressure increases. For purposes of clarity, the movement of retainer 20 and the compression of body 24 have been greatly exaggerated. This pressure (P) produces a normal force ($F_n$) which pushes up against the gripping means 20:

$$F_n = (P)(A_n) \qquad (1)$$

where $A_n$ is the net area on the leg 22b exposed to the pressure (P) in the normal direction, i.e. contacting the body 24. The pressure is produced by the tangential frictional force ($F_t$) between the driven member 18 and the gripping means 20. Also, it will be apparent that $$P = \frac{F_t}{A_t} \qquad (2)$$

where $A_t$ is the net area on the leg 22a exposed to the pressure (P) in the tangential direction, i.e. contacting the body 24. As seen from the drawings, $A_n$ is considerably greater than $A_t$ so that the normal force on the gripping means 20 is always larger than the tangential or frictional force thereon.

Accordingly, so long as the coefficient of friction ($\mu$) between the shoe 26 and the driven member 18 exceeds $A_t/A_n$, the tangential force is transmitted by gripping means 20 to driven member 18 without slippage. The driven member 18 is frictionally locked to the driving member 10, and moves in unison therewith to the left as indicated by the arrow 30. If a larger load is placed on the driven member 18, the member 18 and the gripping means 20 tend to move more to the right relative to member 10. From Equation 2 it is seen that this increases the pressure (P) even more, causing a corresponding increase in the force ($F_n$) pushing the shoe 26 against the driven member 18. Thus, the gripping or locking action afforded by the transmission accommodates itself to the particular load.

In the foregoing analysis it is assumed that the body 24 is isotropic (in at least the normal and tangential directions) as regards pressure and that the area $A_n$ does not change significantly as the pressure (P) changes. An inextensible bladder filled with a liquid meets this criterion. On the other hand, an elastomer such as rubber does not, and the analysis is somewhat modified if a material of this type is used. The basic principles, however, remain the same.

The clearances between legs 22a, 22b and the driving member 10 should be quite small so that when the retainer 22 is forced to the right relative to member 10 as in FIG. 2, the gaps between legs 22a, 22b and member 10 are still small enough to preclude undue bulging of body 24 into these gaps.

Referring again to FIG. 1, when the driving member 10 is caused to move to the right as indicated by the arrow 32, the relative movement of the driven member 18 is to the left. Again the lightly engaging shoe 26 and the retainer 22 tend to be carried along with the driven member 18. However, the end wall 12 of driving member 10 prevents any appreciable movement of the retainer 22 in this direction. Thus, the body 24 is not compressed. Accordingly, there is no upward force ($F_n$) on the gripping member 20, and the shoe 26 is not pressed against the driven member 18. The driven member is therefore free to move with respect to the driving member with minimum drag.

Of course, the roles of the members 10 and 18 may be reversed. That is, the member 18 may function as the driving member and the member 10 as the driven member. In this event the input motion will be coupled to the member 10 only when the member 18 moves to the right as seen in FIG. 1, but in all other respects the transmission will operate as described above.

Thus, it will be appreciated that the FIGS. 1 and 2 embodiment of my invention can function not only as a one-way clutch, but also as a power transmission capable of converting a reciprocating input to an intermittent unidirectional output useful, for example, in stationing and feeding mechanisms.

Figure 3:
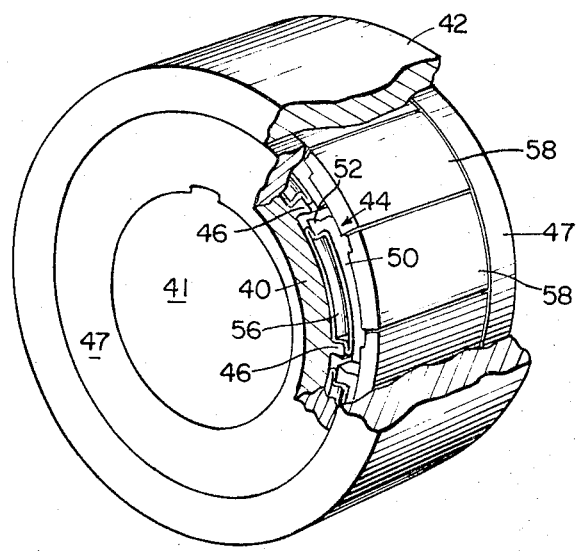
FIG. 3 is a perspective view with parts broken away of an overrunning clutch embodying the principles of my invention.

Refer now to FIG. 3, which shows my improved directional power transmission employed in a rotary overrunning clutch. The clutch includes a generally cylindrical inner race 40 and concentric outer race 42 spaced therefrom. One race, say, the inner race 40, is keyed to a source of rotary power such as a shaft 41. The clutch output is taken from the outer race 42. One or more (herein six) gripping means indicated generally at 44 are spaced around the circumference of the clutch between the races 40 and 42. Each of these functions in much the same way as the gripping means 20 described above in connection with FIGS. 1 and 2 to couple together the two races only when the inner race moves in one direction relative to the outer race.

Referring now to FIGS. 3 and 4, the inner race 40 is formed with six radially outwardly extending ribs 46 running axially from one end of the inner race 40 to the other. Each rib 46 has a wedge-shaped nose portion 46a protruding at one side thereof. The ribs 46, together with the inner race proper and its two side plates 47 (FIG. 3) define a series of arcuate pockets 48 spaced around the circumference of inner race 40, which accommodate the gripping means 44.

The gripping means 44 each comprise a generally L-shaped retainer 50 whose short leg 52 extends into a pocket 48 at the end 48a thereof adjacent a nose portion 46a. Each leg 52 includes a protruding wedge-shaped nose portion 52a which interfits with nose portion 46a of the adjacent rib 46. The long leg 54 of each retainer 50 has the same center of curvature as the inner and outer races 40 and 42 respectively and terminates over the rib 46 at the other end 48b of its corersponding pocket 48.

In accordance with the invention, a deformable body in the form of a flexible fluid-filled chamber 56 is snugly positioned within each pocket 48 between the retainer 50 and the inner race 40 with its rib 46. The chambers 56 are constructed preferably of a strong flexible material such as rubber reinforced with glass fibers or metal strands. On the other hand, they may be fabricated entirely of a suitable flexible metal. The chambers are filled with a substantially incompressible fluid such as silicone oil, for example, and have capacity for transmitting forces equally in all directions, in accordance with Pascal's Law, when external forces are applied. Of course, it will be understood that the other bodies mentioned above in connection with the FIGS. 1 and 2 embodiment of my invention are also suitable for use here, the only requirement being that when the body is subjected to a force or compressed, it exerts a radially outward force against the retainer 50 which is sufficiently larger than the tangential force to be exerted against the retainer as described herein.

Still referring to FIGS. 4 and 5, a series of shoes 58 are positioned between the retainers 50 and the inner surface 60 of outer race 42. Each shoe 58 is notched at 62 and is thus seated between radially outwardly extending keys 64 on the legs 54 of retainers 50. Each retainer 50 supports, in whole or in part three shoes 58 and the shoes together form essentially a continuous ring all around the retainers 50 and rotate therewith just inside the outer race 42. While the shoes 58 are keyed for rotation with the retainers 50, and hence the inner race 40, they are free to slide axially with respect thereto. This feature greatly simplifies manufacturing the clutch to the required tolerances, particularly if the opposing surfaces of the shoes 58 and outer race 42 are formed with interfitting ribs and grooves for increasing the gripping force as described more specifically in United States Patent No. 3,107,764.

Referring now to FIG. 5, the shoes 58 lightly frictionally engage the inside surface 60 of outer race 42. Thus when the inner race 40 is rotated counter-clockwise, the shoes 58, together with their retainers 50, tend to move with the outer race 42 clockwise relative to race 40. The retainer legs 52 and ribs 46 at the opposite sides of each chamber 56 are forced toward one another. This force increases the pressure in each chamber 56. The pressure increase, in turn, gives rise to radially outwardly directed forces against the retainers 50, which push the shoes 58 against the opposing surface 60 of outer race 42. As before, the motion of the retainers 50 has been highly exaggerated for the sake of clarity. In actuality, the chambers 56 are substantially incompressible and consequently retainers 50 would travel only slightly counter-clockwise relative to race 40. Of course, such minimum motion is desirable to minimize the lost motion or lag in the system.

As described in connection with the FIGS. 1 and 2 embodiment of my invention, the chambers 56 are shaped and constrained to produce a greater force on their retainers 50 in the normal or radial direction than in the tangential direction. That is, the area of each chamber 56 bearing against the corresponding leg 54 is substantially greater than the area thereof bearing against the adjacent leg 52. Thus, the gripping means 44 together grip or lock the two races together and transmit torque between the two without slippage. Also as described previously, if the load increases, the coupling force increases correspondingly.

Referring again to FIG. 4, if the inner race 40 is rotated in the clockwise direction, the gripping means 44 tend to move with the outer race 42 clockwise relatively. However, any appreciable movement of the gripping means 44 in this direction is prevented by the engagement of the leg portions 52a and the opposing rib portions 46a. There is no force applied to the chambers 56, and consequently, no radially outwardly directed force is developed to push the gripping means 44 and their associated shoes 58 into engagement with the outer race 42. Thus, the inner race is free to rotate in this direction independently of the outer race and with minimum drag.

It will be appreciated from the foregoing then that my directional power transmission is capable of coupling forces or torques between driving and driven members over relatively large areas in mating contact with the result that the components of my transmission suffer very little wear. The transmission itself is quite small and compact and hence has a high power to weight ratio. Moreover, it requires little maintenance and has a correspondingly long useful life. It will be clear also than an over-running clutch made in accordance with the invention possesses the same aforesaid advantages. Moreover, it suffers minimum lag and develops no internal frictional forces tending to inhibit the gripping action of the clutch.

It will thus be seen that the objects set forth above among those made apparent on the preceding description are efficiently obtained and, since certain changes may be made in the above construction without departing from the scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described, and all statement of the scope of the invention which, as a matter of language, might be said to fall therebetween.

Having described the invention, what I claim is new and secured by Letters Patent is:

1. A directional power transmission comprising a driving member, a driven member, said driving and driven members being constrained to move relatively along parallel surfaces, and gripping means between said members, said gripping means being movable with a first one of said members, said gripping means including a gripper frictionally engaging the other of said members and tending to move therewith, said gripping means also including pressure transmitting means positioned between said first member and said gripper, said pressure transmitting means being characterized by its capacity for exerting pressure in one direction when subjected to a force in another direction, said gripper having a portion thereof which applies a force in said other direction to said pressure transmitting means when said driving member moves in a preferred direction relative to said driven member so that said pressure transmitting means pushes said gripper in said one direction into non-slip engagement with said other of said members, said members thereby moving in unison in said preferred direction, said gripper portion exerting no appreciable force on said pressure transmitting member when said driving member moves in other directions relative to said driven member, whereby said driving and driven members are free to move independently.

2. A directional power transmission as defined in claim 1 wherein said pressure transmitting means is substantially isotropic.

3. A power transmission as defined in claim 2 wherein said power transmitting means is a collection of balls.

4. A power transmission as defined in claim 2 wherein said pressure transmitting means is a flexible fluid-filled chamber.

5. A power transmission as defined in claim 1 wherein said pressure transmitting means is a deformable resilient body.

6. A power transmission as defined in claim 1 wherein said pressure transmitting means is a collection of parallel cylinders.

7. A directional power transmission comprising a driving member, a driven member, said driving and driven members being held in fixed spaced relation and being movable relatively along spaced parallel surfaces, and gripping means between said members, said gripping means being movable with said driving member, said gripping means including a gripper in frictional engagement with said driven member and slideable in a first direction with respect to said driving member when said driven member moves in a preferred direction relative to said driving member, said gripping means also including pressure transmitting means positioned between said driving member and said gripper, said gripper compressing said pressure transmitting means in said first direction when said driven member moves in said preferred direction relative to driving member so that, said pressure transmitting means pushes said gripper in a second direction into non-slip engagement with said driven member whereby both said driving and driven members move in unison in said preferred direction.

8. A directional power transmission comprising a driving member, a driven member, said driving and driven members being held in fixed spaced relation and adapted to move relatively along parallel surfaces, and gripping means between said members, said gripping means being movable with said driving member, said gripping means including a gripper slideably mounted with respect to said driving means, said gripper having a large area surface in frictional engagement with said driven means and a smaller area surface disposed at an angle thereto, said gripping means also including pressure transmitting means disposed between said driving means and said gripper, said smaller gripper portion compressively engaging said pressure transmitting means whenever said driven member moves in one direction relative to said driving member, said pressure transmitting means then exerting pressure against said larger gripper portion thereby pressing said gripper into non-slip engagement with said driven member whereby said driving and driven members are locked together while moving in said one direction, said smaller portion remaining out of compressive engagement with said pressure transmitting means when said driven member moves in the opposite direction relative to said driving member whereby said driving and driven members are free to move independently of each other.

9. A directional power transmission as defined in claim 8 wherein the force exerted by said pressure transmitting means on said larger gripper portion is substantially larger than the force exerted by said pressure transmitting means on said smaller gripper portion.

10. The directional power transmission as defined in claim 8 wherein the ratio of the area of the smaller gripper portion to the area of the larger gripper portion is less than the coefficient of friction between said gripper and said driven member.

11. An overrunning clutch comprising an inner race, an outer race coaxially spaced from said inner race, and gripping means between said races, said gripping means being movable with one and frictionally engaging the other of said races, said gripping means comprising a plurality of grippers disposed around the circumference of said races and a corresponding plurality of pressure transmitting means positioned between said inner race and said grippers, each of said grippers having a portion thereof which compresses its corresponding pressure transmitting means in a first direction when said inner race moves in one direction relative to said outer race, whereby each said pressure transmitting means pushes each said corresponding gripper in a second direction into non-slip engagement with said outer race, said gripper portions exerting no appreciable compressive force on said pressure transmitting means when said inner race moves in the other direction relative to said outer race whereby said races are free to move independently.

12. A clutch comprising an inner race, an outer race and a plurality of grippers spaced around the circumference of said clutch between said races, a corresponding plurality of deformable, pressure transmitting bodies positioned between said grippers and one of said races, means on each of said grippers for compressing its corresponding body in a first substantially tangential direction when said races move in one direction relatively so that said body pushes said grippers in a substantially radial direction against the other of said races whereby said races move in unison, said means on each of said grippers remaining out of compressive engagement with said corresponding body when said races move in the other direction relatively whereby said races are free to move independently.

13. A clutch as defined in claim 12 wherein said bodies comprise deformable fluid filled chambers.

14. A clutch as defined in claim 12 wherein said bodies comprise flexible resilient solid masses.

15. A clutch as defined in claim 12 wherein the portion of each of said grippers engaging the other of said races is composed of a long-wearing material having a relatively high coefficient of friction and is slidable axially relative to the rest of the gripper.

16. A clutch as defined in claim 15 wherein said portions on said grippers and the opposing surface of the other of said races have interfitting ribs and grooves.

References Cited

UNITED STATES PATENTS

| | | | |
|---|---|---|---|
| 1,618,915 | 2/1927 | Constantinesco | 192—41 |
| 1,814,566 | 7/1931 | Lombard | 192—105 |
| 2,613,779 | 10/1952 | Milford | 192—58 |
| 2,738,048 | 3/1956 | Douglas | 192—58 X |
| 2,910,160 | 10/1959 | Meder | 192—58 X |
| 3,262,527 | 7/1966 | Allaben | 192—58 |

DONLEY J. STOCKING, *Primary Examiner.*

ARTHUR T. McKEON, *Examiner.*

UNITED STATES PATENT OFFICE
CERTIFICATE OF CORRECTION

Patent No. 3,365,037                  January 23, 1968

Bertram A. Fulton

It is certified that error appears in the above identified patent and that said Letters Patent are hereby corrected as shown below:

Column 1, line 58, "efficiency" should read -- efficientl --. Column 2, lines 44 and 45, "floats on a body positioned between the driving members" should read -- floating gripping means. The driving and driven members --. Column 3, line 57, "diretcion" should read -- direction --. Column 6, line 71, "than" should read -- that --.

Signed and sealed this 28th day of October 1969.

(SEAL)

Attest:

Edward M. Fletcher, Jr.                  WILLIAM E. SCHUYLER, JR.

Attesting Officer                          Commissioner of Patents